United States Patent
Lu et al.

(10) Patent No.: US 8,582,503 B2
(45) Date of Patent: Nov. 12, 2013

(54) METHOD FOR INDICATING THE BEARER MANAGEMENT OF A SERVING GATEWAY

(75) Inventors: Fei Lu, Guangdong (CN); Jinguo Zhu, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 343 days.

(21) Appl. No.: 12/934,531

(22) PCT Filed: Jun. 16, 2008

(86) PCT No.: PCT/CN2008/071327
§ 371 (c)(1),
(2), (4) Date: Sep. 24, 2010

(87) PCT Pub. No.: WO2009/117879
PCT Pub. Date: Oct. 1, 2009

(65) Prior Publication Data
US 2011/0019624 A1 Jan. 27, 2011

(30) Foreign Application Priority Data
Mar. 26, 2008 (CN) .......................... 2008 1 0087760

(51) Int. Cl.
*H04W 4/00* (2009.01)

(52) U.S. Cl.
USPC .......................................... 370/328; 370/331

(58) Field of Classification Search
USPC ........................................................ 370/328
See application file for complete search history.

(56) References Cited

U.S. PATENT DOCUMENTS

2008/0259873 A1* 10/2008 Ahmavaara et al. .......... 370/331
2009/0111428 A1* 4/2009 Blommaert et al. .......... 455/411

FOREIGN PATENT DOCUMENTS

| CN | 1870772 A | 11/2006 |
|---|---|---|
| CN | 1874544 A | 12/2006 |
| CN | 101087200 A | 12/2007 |
| EP | 2053871 | 4/2009 |

OTHER PUBLICATIONS

3GPP Standard; 3GPP TS 23.401, 3rd Generation Partnership Project (3GPP), "3rd Generation Partnership Project." No. V8.1.0, Mar. 1, 2008, pp. 1-171, XP050363623.
ZTE:"Bearer Update Indication in Create Bearer Request Message",3GPP DRAFT;S2-082245-BEAR_UPDATE_INDICATION, 3GPP, vol. SA WG2, No. Jeju; 20080401, Apr. 1, 2008, XP050264602.

* cited by examiner

*Primary Examiner* — Huy D Vu
*Assistant Examiner* — Kevin Cunningham
(74) *Attorney, Agent, or Firm* — Li & Cai Intellectual Property (USA) Office

(57) ABSTRACT

The present invention provides a method for indicating a serving gateway to update the bearer, comprising: a mobility management unit sending to a serving gateway a bearer establishing request message carrying a bearer update indication for indicating the serving gateway whether to update the bearer between the serving gateway and a packet data network gateway immediately; after receiving the bearer establishing request message, the serving gateway determining whether to update the bearer between the serving gateway and the packet data network gateway immediately according to the bearer update indication carried in the message. The method provided by the present invention can enable the serving gateway to easily judge when to update the bearer between the serving gateway and the packet data network gateway so as to avoid updating the bearer between the serving gateway and the packet data network gateway by the serving gateway too early or too late.

20 Claims, 4 Drawing Sheets

METHOD FOR INDICATING THE BEARER MANAGEMENT OF A SERVING GATEWAY

TECHNICAL FIELD OF THE INVENTION

The present invention relates to a method for indicating the bearer management of a serving gateway in a packet domain and its evolved domain of a mobile communication system.

BACKGROUND OF THE INVENTION

With the booming of the Wimax (World Interoperability for Microwave Access), the third generation mobile communication system has to improve its network performance and reduce costs of the network construction and operation to maintain its powerful competence in the mobile communications field. Therefore, the standardization workgroup of the 3GPP (the $3^{rd}$ Generation Partnership Project) is now focusing on the research of evolution of the PS Core (Packet Switch Core) and the UTRAN (Universal Mobile Telecommunication System Radio Access Network). The research project is called System Architecture Evolution (SAE) aiming at higher transmission rate, shorter transmission time delay, optimized packet and support of mobility management among the E-UTRAN (Evolved UTRAN), UTRAN, WLAN (Wireless Local Area) and other non-3GPP access networks provided by the Evolved Packet Core (EPC).

As shown in FIG. 1, at present the architecture of the SAE comprises the following network elements:

an E-RAN (Evolved RAN): an Evolved Radio Access Network, providing higher uplink and downlink rate, lower transmission delay and more reliable wireless transmission. The network element included in the E-RAN is eNodeB (Evolved NodeB, evolved base station) to provide wireless resources for user access.

a PDN (Packet Data Network): a network for providing services to users.

an E-Packet Core: an evolved packet network, providing lower delay and allowing accesses of more wireless access systems, comprising the following network elements:

an MME (Mobility Management Entity): a control plane function entity, a server for temporarily storing user data, being responsible for managing and storing the context of a UE (such as identification of the UE/User, mobility management state, and user security parameter etc.), allocating temporary identifications to users, when the UE is located in this tracking area or this network, performing authentication to this user, processing all non-access layer messages between the MME and the UE, and triggering paging in the SAE. The MME is a mobility management unit in the SAE system, while the mobility management unit is the SGSN (Serving GPRS Support Node) in the UMTS (Universal Mobile Telecommunications system).

a Serving GW (Gateway): this gateway is a user plane entity, being responsible for processing the user plane data routing and terminating the downlink data of the UE in an idle (ECM_IDLE) state, managing and storing the SAE bearer context of the UE, such as an IP bearer service parameter and a network internal routing information etc. The Serving GW is an anchor point of the internal user plane in the 3GPP system and there is only one Serving GW for one user at one time.

a PDN GW: a Packet Data Network Gateway, a gateway being responsible for enable the UE to access the PDN, allocating IP addresses for users, and meanwhile being the mobility anchor point of the access systems of the 3GPP and the non-3GPP. The functions of the PDN GW further comprise: policy implementation, charging support and so on. A user may access a plurality of PDN GWs simultaneously. A PCEF (Policy and Charging Enforcement Function) is located in the PDN GW as well.

a PCRF (Policy and Charging Rules Function): responsible for providing policy control and charging rules to the PCEF.

an HSS (Home Subscriber Server): for permanently storing user subscription data. The contents stored in the HSS comprise an IMSI (International Mobile Subscriber Identification) of the UE and the IP address of the PDN GW.

Physically, the Serving GW and the PDN GW may be combined as one. The user plane network elements of the EPC system comprise the Serving GW and the PDN GW.

When the UE (User Equipment) moves in the EPC, a mobility management may occur for the UE: when the UE moves to a new tracking area list, a TAU (Tracking Area Update) process may occur between the UE and the network; when the UE is in an ECM_CONNECTED state, the UE moves to a new eNodeB, an HO (Handover) process will occur for the UE. When the TAU or the HO process occurs for the UE, the Serving GW connected to the UE may change, and thus the Serving GW needs to send a bearer update request message to the PDN GW to update the bearer between the Serving GW and the PDN GW.

During the TAU or the HO process where the Serving GW changes in the prior art, there are two manners of updating the bearer between the Serving GW and the PDN GW: one manner is, upon receiving a bearer establishing request message from the mobility management unit (the MME or the SGSN), the Serving GW immediately sends a bearer update request message to the PDN GW to update the bearer between the Serving GW and the PDN GW (as shown in FIG. 2); the other manner is the Serving GW sends the bearer update request message to the PDN GW to update the bearer between the Serving GW and the PDN GW only after it acquires the address of the eNodeB and a TEID (Tunnel Endpoint Identifier) (as shown in FIG. 3). Since there are two manners of updating the bearer between the Serving GW and the PDN GW by the Serving GW, if the mobility management unit does not indicate the Serving GW when to update the bearer between the Serving GW and the PDN GW, it may possibly occur that the Serving GW updates the bearer between the Serving GW and the PDN GW too early or too late.

SUMMARY OF THE INVENTION

The object of the present invention is to provide a method for indicating the bearer update of a Serving GW to avoid updating the bearer between the Serving GW and the PDN GW by the Serving GW too early or too late.

To solve the above technical problem, the present invention provides a method for indicating the serving gateway to update the bearer, comprising:

a mobility management unit sending to a serving gateway a bearer establishing request message carrying a bearer update indication for indicating the serving gateway whether to update the bearer between the serving gateway and a packet data network gateway immediately;

after receiving the bearer establishing request message, the serving gateway determining whether to update the bearer between the serving gateway and the packet data network gateway immediately according to the bearer update indication carried in the message.

Further, the mobility management unit is a mobility management entity, MME, or a serving GPRS support node, SGSN.

Further, when the serving gateway changes, the mobility management unit sends the bearer establishing request message to the serving gateway.

Further, the bearer update indication includes an immediate bear update indication;

in an update process of a tracking area or a routing area, the mobility management unit sends to the serving gateway the bearer establishing request message carrying the immediate bearer update indication, and after receiving the immediate bearer update indication, the serving gateway updates the bearer between the serving gateway and the packet data network gateway immediately.

Further, the bearer update indication includes a later bearer update indication;

in the handover process, the mobility management unit sends to the serving gateway the bearer establishing request message carrying the later bearer update indication, and after receiving the later bearer update indication, the serving gateway does not update the bearer between the serving gateway and the packet data network gateway immediately.

Further, after receiving the later bearer update indication, the serving gateway updates the bearer between the serving gateway and the packet data network gateway after it acquiring the address of a destination access point of the handover and a tunnel endpoint identifier, TEID.

Further, in the handover process, the mobility management unit sends to the serving gateway the bearer establishing request message without carrying the bearer update indication which indicates the serving gateway not to update the bearer between the serving gateway and the packet data network gateway immediately.

Further, when receiving the bearer establishing request message without carrying the bearer update indication, the serving gateway does not update the bearer between the serving gateway and the packet data network gateway immediately.

Further, when receiving the bearer establishing request message without carrying the bearer update indication, the serving gateway updates the bearer between the serving gateway and the packet data network gateway after it acquiring the address of the destination access point of the handover and the TEID.

Further, the destination access point is a Universal Mobile Telecommunication System Radio Access Network, UTRAN or an evolved base station eNodeB.

To sum up, the present invention provides a method for indicating the bearer update of the Serving GW. With this method, it is very easy for the Serving GW to judge when to update the bearer between the Serving GW and the PDN GW so as to avoid updating the bearer between the Serving GW and the PDN GW by the Serving GW too early or too late.

DETAILED DESCRIPTION OF THE PREFERRED EMBODIMENTS

Figure 1:
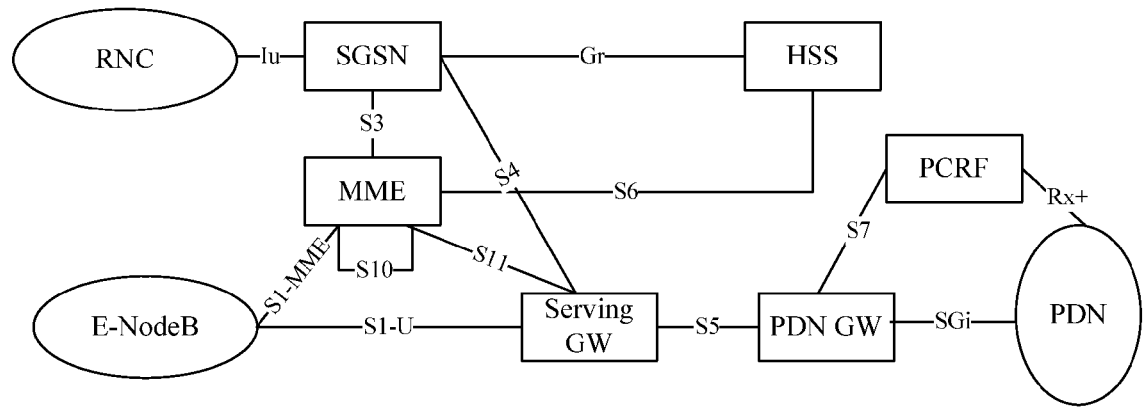
FIG. 1 is a diagram of the architecture of the SAE in the prior art.
Figure 2:
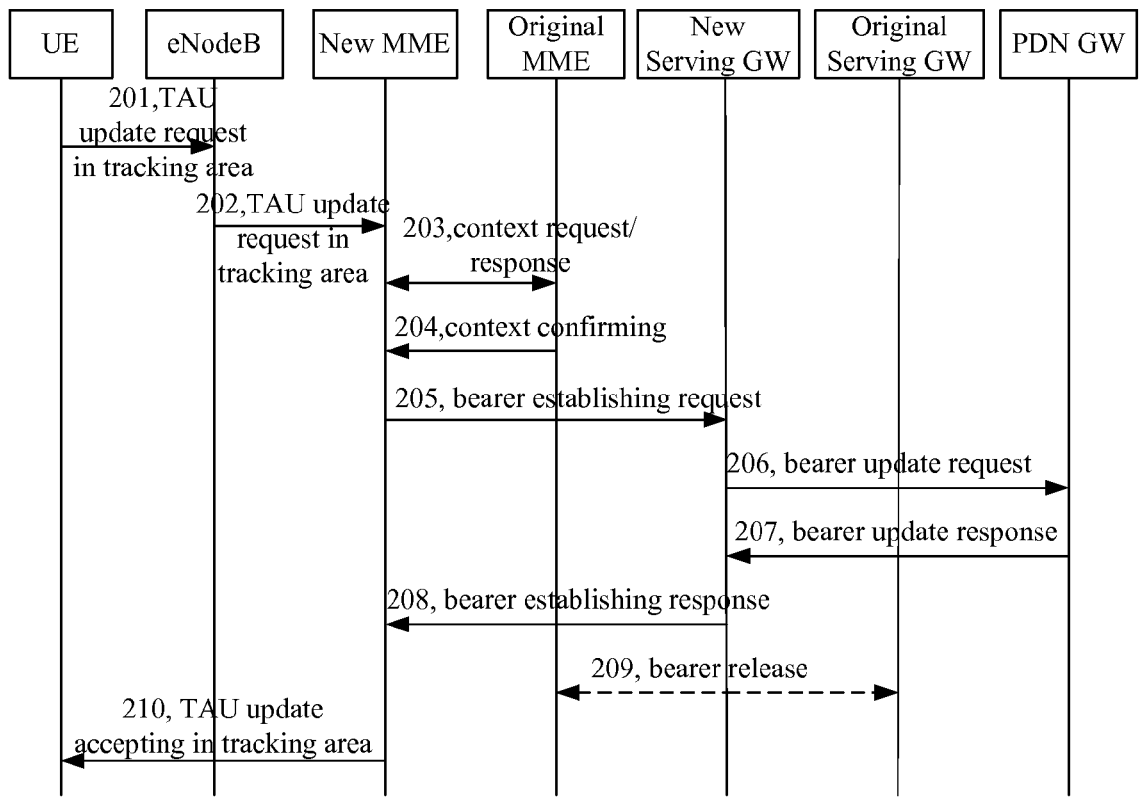
FIG. 2 is a flow chart of the TAU in the prior art, which comprises the Serving GW updating the bearer between the Serving GW and the PDN GW immediately after receiving the bearer establishing request message.
Figure 3:
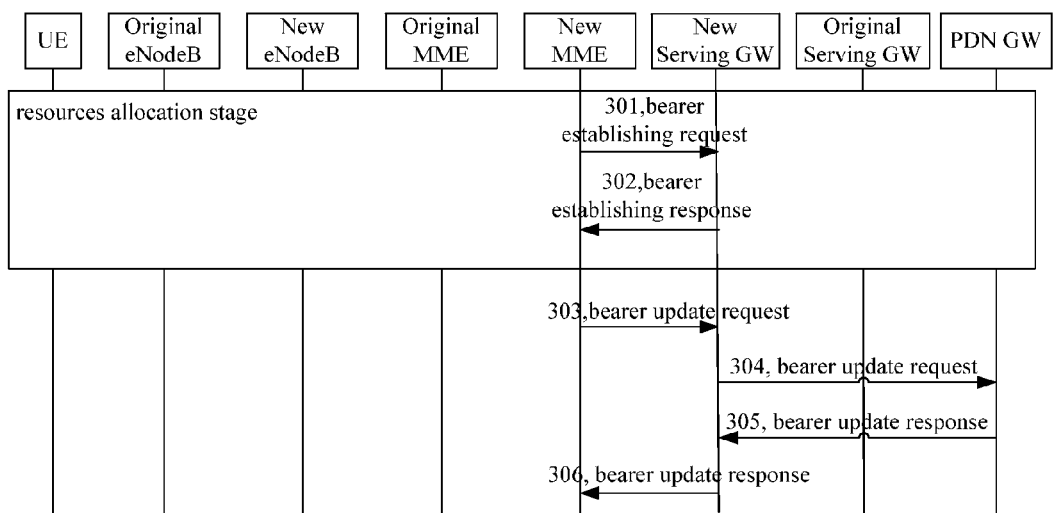
FIG. 3 is a flow chart of the HO in the prior art, which comprises the Serving GW updating the bearer between the Serving GW and the PDN GW after it acquires the address of the eNodeB and the TEID.

The technical solution of the present invention will be described in combination with the accompanying drawings and embodiments in detail as follows.

The present invention provides a method for indicating a Serving GW to update the bearer by means of a bearer update indication being carried in a bearer establishing request message sent by a mobility management unit (an MME or an SGSN) to the Serving GW to indicate the Serving GW when to update the bearer. The bearer update indication serves to indicate the Serving GW whether to update the bearer between the Serving GW and a PDN GW immediately, and the Serving GW acquires whether to update the bearer between the Serving GW and the PDN GW immediately according to the bearer update indication received.

The method for indicating the Serving GW to update the bearer provided by the present invention comprises:

(a) the mobility management unit sends to the Serving GW the bearer establishing request message carrying the bearer update indication for indicating the Serving GW whether to update the bearer between the Serving GW and the PDN GW immediately;

(b) after receiving the bearer establishing request message, the Serving GW determines whether to update the bearer between the Serving GW and the PDN GW immediately according to the bearer update indication carried in the message.

In step (a), the mobility management unit is the MME or the SGSN. For example, in the SAE system, the mobility management unit is the MME, while in the UMTS system, the mobility management unit is the SGSN.

In step (a), in the TAU or the HO process where the Serving GW changes, the mobility management unit needs to send the bearer establishing request message to the Serving GW.

The bearer update indication may include an immediate bearer update indication and a later bearer update indication.

In step (a), in the update process of a tracking area or a routing area, when sending the bearer establishing request message, the mobility management unit carries the immediate bearer update indication. In the handover process, when sending the bearer establishing request message, the mobility management unit carries the later bearer update indication.

In step (b), the Serving GW determining whether to update the bearer between the Serving GW and the PDN GW immediately according to the bearer update indication received means if the bearer update indication is the immediate bearer update indication, and the Serving GW is required to update the bearer between the Serving GW and the PDN GW immediately, then the Serving GW sends the bearer update request message to the PDN GW after receiving the bearer establishing request message; if the bearer update indication is the later bearer update indication, and the Serving GW does not need to update the bearer between the Serving GW and the PDN GW immediately, then the Serving GW does not update the bearer between the Serving GW and the PDN GW immediately after receiving the bearer establishing request message, and the Serving GW sends the bearer update request message to the PDN GW later. That is, the Serving GW sends the bearer update request message to the PDN GW after it acquires the address of the destination access point (the eNodeB or the UTRAN) and the TEID.

The mobility management unit and the serving gateway may also make an agreement that the situation of "the bearer update indication is carried in the bearer request message" is regarded as "the immediate bearer update indication", while the situation of "the bearer update indication is not carried in the bearer request message" is regarded as "the later bearer update indication".

In step (a), when sending the bearer establishing request message to the serving gateway, the mobility management unit may also not carry the bearer update indication which indicates the serving gateway not to update the bearer between the serving gateway and the packet data network gateway immediately. In step (b), when the serving gateway receives the bearer establishing request message, and if the bearer update indication is not carried in the message, the serving gateway does not update the bearer between the serving gateway and the packet data network gateway immediately. That is, the serving gateway updates the bearer between the serving gateway and the packet data network gateway after it acquires the address of the destination access point (the eNodeB or the UTRAN) of the handover and the TEID.

The present invention will be described in combination with the accompanying drawings and the embodiments in detail as follows.

Figure 4:
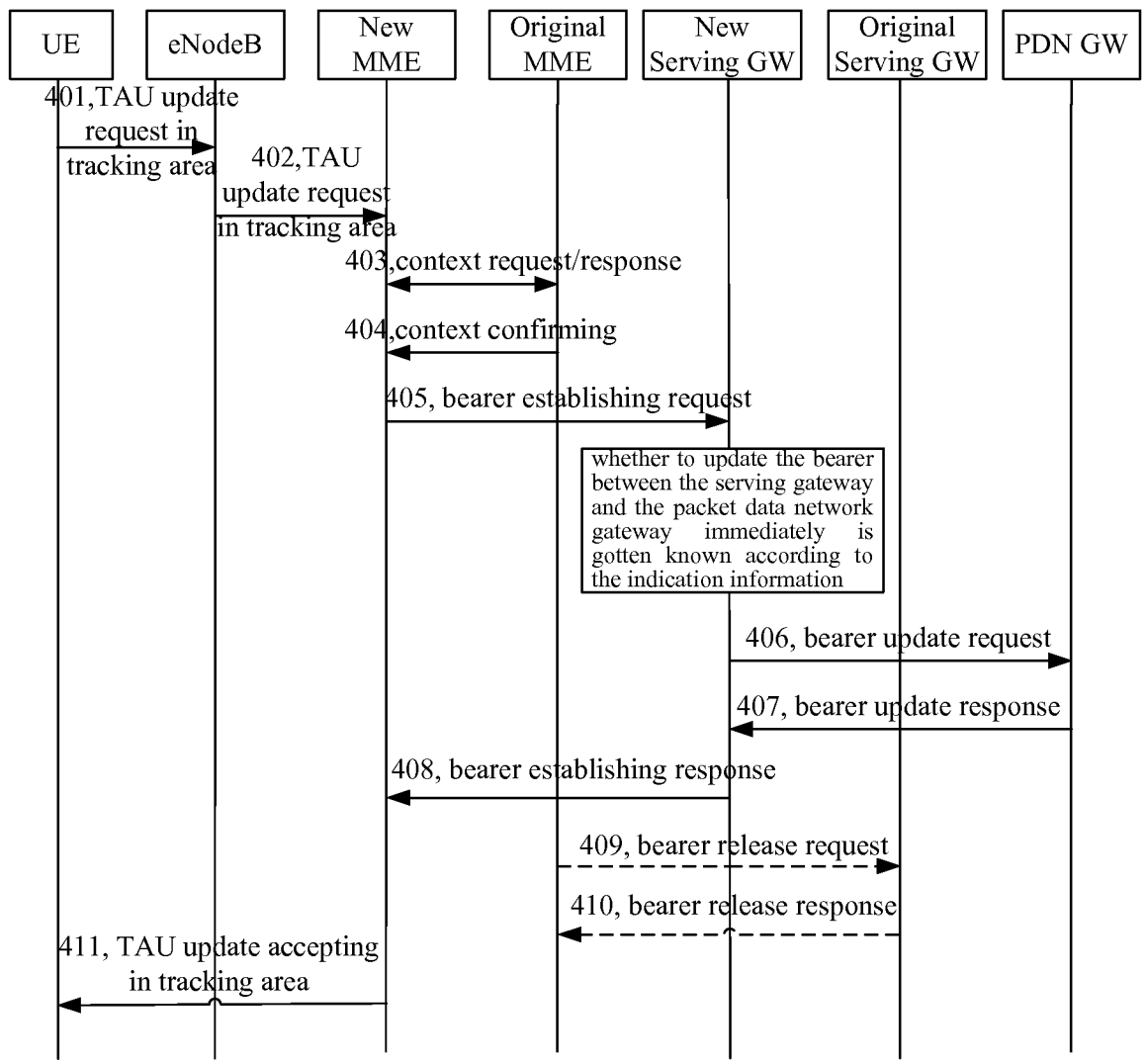
FIG. 4 is a flow chart showing the implementation of the TAU that the bearer update indication is included in the bearer establishing request message sent by the MME to the Serving GW.

As shown in FIG. 4, in the TAU process of the UE, when the Serving GW changes, the indication of the Serving GW whether to update the bearer between the Serving GW and the PDN GW is included in the bearer establishing request message sent by the MME to the Serving GW. This embodiment comprises the following steps:

Step 401, when detecting the current tracking area is not in the registered tracking area list, the UE sends to the eNodeB a TAU request message in which the original GUTI (Globally Unique Temporary Identity) of the UE is carried.

Step 402, the eNodeB deduces the MME according to the original GUTI. If the MME is not associated with the eNodeB, the eNodeB re-selects a new MME and forwards the TAU request message to the new MME.

Step 403, the new MME sends a context request message including the original GUTI and the TAU request message to the original MME to acquire user information. If the authentication of the UE is successful, the original MME activates a timer. The original MME responses to the new MME a context response message which includes the IMSI of the UE, security parameters, the address of the PDN GW and the TEID etc.

Step 404, the new MME determines whether to re-allocate the Serving GW. When the current Serving GW can not serve this user any more, the new MME re-selects a Serving GW. The new MME needs to send to the original MME a context confirming message including an indication that Serving GW has changed.

Step 405, the new MME sets up an MM (Mobility Management) context for the UE, and at the same time the new MME sends to the new selected Serving GW the bearer establishing request message in which the IMSI, a user plane address of the PDN GW and the TEID are carried. The new MME judges the process is the TAU process and therefore creates the immediate bearer update indication and sends it to the Serving GW along with the bearer establishing request message. The immediate bearer update indication is used to indicate the Serving GW to update the bearer between the Serving GW and the PDN GW immediately.

Step 406, the new selected Serving GW gets known that the bearer between the Serving GW and the PDN GW needs to be updated immediately according to the immediate bearer update indication carried in the bearer establishing request message received. The Serving GW sends to the PDN GW the bearer update request message including the address of the Serving GW and the TEID.

Step 407, the PDN GW updates the context of the bearer and returns the bearer update response message to the Serving GW.

Step 408, the Serving GW returns to the MME the bearer establishing response message including the user-plane address of the Serving GW and the TEID.

Step 409, since the original MME has gotten known in the context confirming message that the Serving GW had changed, it needs to send to the original Serving GW a bearer release request message including the release reason and the TEID. The release reason serves to indicate that the original Serving GW does not need to release the bearer between the Serving GW and the PDN GW.

Step 410, the PDN GW returns to the original Serving GW a bearer release response message.

Step 411, the new MME sends to the UE a TAU accepting message including the GUTI, a tracking area list and the security parameters etc.

The authentication process and location update process which are not associated with the present invention are omitted in this embodiment. In this embodiment, the method that the bearer establishing request message sent by the MME to the new Serving GW indicates the Serving GW whether to update the bearer between the Serving GW and the PDN GW immediately is also applicable for the update processes where the new MME and the original MME are substituted with other mobility management units or the new eNodeB and the original eNodeB are substituted with tracking area or routing area of other access points.

Figure 5:
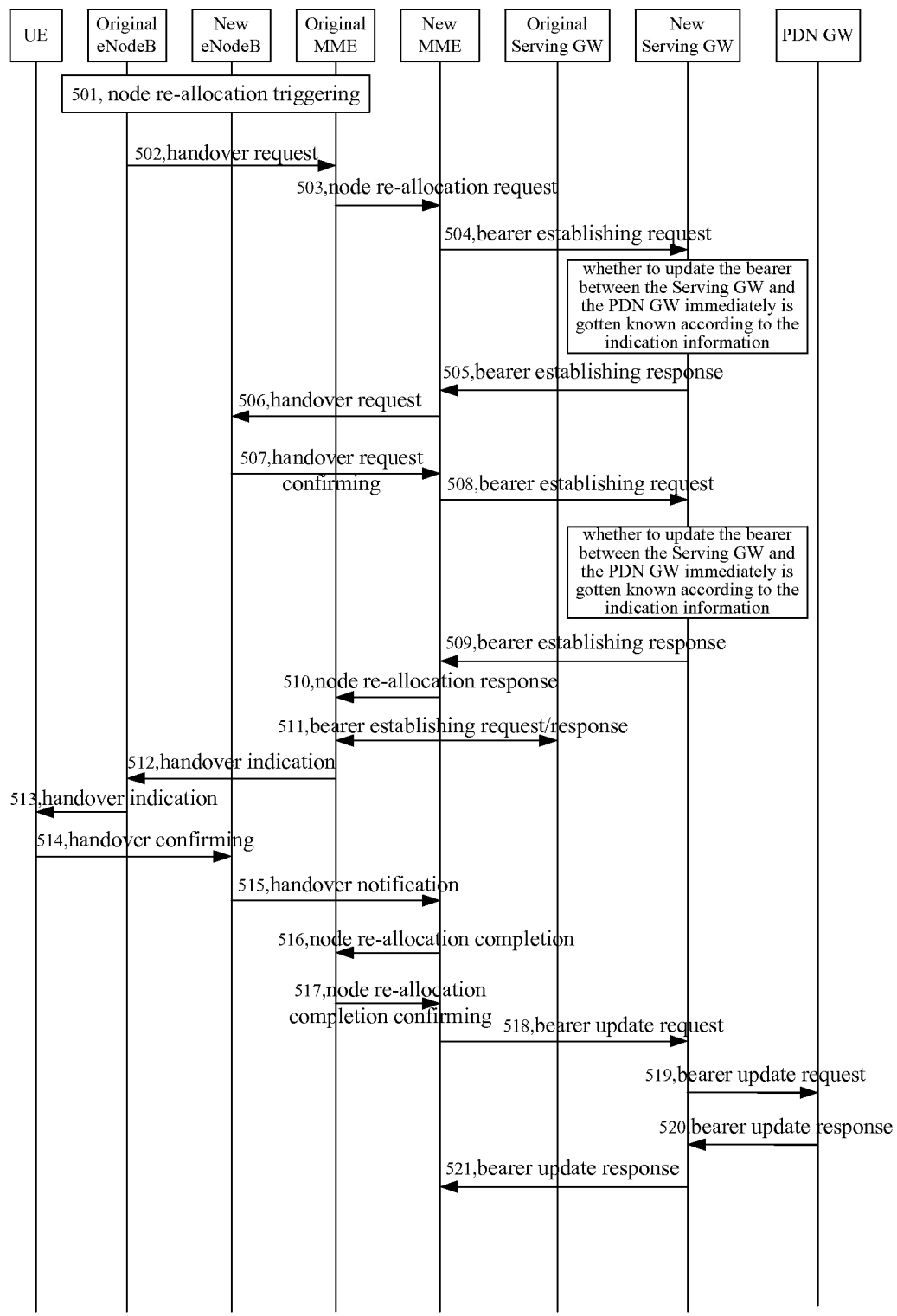
FIG. 5 is a flow chart showing the implementation of the HO that the bearer update indication is included in the bearer establishing request message sent by the MME to the Serving GW.

As shown in FIG. 5, in the HO process of the UE, when the Serving GW changes, the indication of the Serving GW whether to update the bearer between the Serving GW and the PDN GW immediately is included in the bearer establishing request message sent by the MME to the Serving GW. The embodiment comprises the following steps:

Step 501, the original eNodeB determines to initiate the handover of the re-allocation among the eNodeBs, and of the re-allocation among core network nodes to the destination eNodeB.

Step 502, the original eNodeB sends the handover request message to the original MME.

Step 503, the original MME selects a new MME according to the MME selection function and sends to the new MME a node re-allocation request message which should include the address of the PDN GW, an uplink TEID of the PDN GW, the address and an uplink TEID of the Serving GW.

Step 504, the new MME judges whether the UE can use the original Serving GW continuously. If the original Serving GW can not be used any more, the new MME will select a proper Serving GW. The new MME judges the process to be the HO process, therefore it creates the later bearer update indication for indicating the Serving GW to update the bearer between the Serving GW and the PDN GW later. The new MME sends to the new selected Serving GW the bearer establishing request message in which the later bearer update indication is carried.

Step 505, the new Serving GW gets known that it will update the bearer between the Serving GW and the PDN GW after it acquiring the address of the new eNodeB and the TEID according the later bearer update indication carried in the bearer establishing request message received. The new Serving GW allocates the address of the Serving GW and the uplink TEID of an S1-U interface and returns the bearer establishing response message to the new MME.

Step 506, the new MME sends to the new eNodeB the handover request message which sets up a UE context in the new eNodeB.

Step 507, the new eNodeB sends the handover request confirming message to the new MME.

Step 508, if a direct connecting way can not be used between the original eNodeB and the new eNodeB, the new MME sets up the forwarding parameters in the new Serving GW by sending the bearer establishing request message to the new Serving GW. The new MME judges the process to be the HO process, and therefore it creates the later bearer update indication for indicating the Serving GW to update the bearer between the Serving GW and the PDN GW later. The later bearer update indication and the bearer establishing request message are sent to the new Serving GW together.

Step 509, the new Serving GW gets known that it will update the bearer between the Serving GW and the PDN GW after it acquiring the address of the new eNodeB and the TEID according to the later bearer update indication received. The new Serving GW returns the bearer establishing response message to the new MME.

Step 510, the new MME sends the node re-allocation response message to the original MME.

Step 511, if the direct connecting way is not used between the original eNodeB and the new eNodeB, the original MME updates the forwarding parameters of the original Serving GW. The forwarding parameters are updated by transmitting the bear establishing request message and response message between the original MME and the original Serving GW.

Step 512, the original MME sends the handover indication message to the original eNodeB.

Step 513, the original eNodeB sends the handover indication to the UE.

Step 514, after being synchronized with the cell of the new eNodeB, the UE sends the handover confirming message to the new eNodeB. The original eNodeB can forward the downlink data to the UE and the uplink data from the UE can be forwarded to the Serving GW.

Step 515, the new eNodeB sends a handover notification message to the new MME.

Step 516, the new MME sends a node re-allocation completion message to the original MME.

Step 517, the original MME returns to the new MME a node re-allocation completion confirming message.

Step 518, the new MME sends to the new Serving GW the bearer update request message in which the address of the new eNodeB and the TEID are carried.

Step 519, the new Serving GW is re-allocated. The Serving GW allocates the addresses and the downlink TEID of the S5/S8 interface and sends these parameters to the PDN GW along with the bearer update request message. The PDN GW may send data to the new Serving GW according to these addresses and TEID.

Step 520, the PDN GW returns the bearer update response message to the new Serving GW.

Step 521, the new Serving GW returns the bearer update response message to the new MME.

The location update process which is not associated with the present invention is omitted in this embodiment. In this embodiment, the method that the bearer establishing request message sent by the MME to the new Serving GW indicates the Serving GW whether to update the bearer between the Serving GW and the PDN GW immediately is also applicable for the handover processes where the new MME and the original MME are substituted with other mobility management units or the new eNodeB and the original eNodeB are substituted with other access points.

The present invention may certainly have various embodiments. It is understood by those skilled in the art that various alterations and changes may be made within the spirit and scope of the invention. All modifications, substitute equivalents made therein are intended to be embraced in the claims of this invention.

INDUSTRIAL APPLICABILITY

The method provided by the present invention can enable the serving gateway to easily judge when to update the bearer between the serving gateway and the packet data network gateway so as to avoid updating the bearer between the serving gateway and the packet data network gateway by the serving gateway too early or too late.

The invention claimed is:

1. A method for indicating a serving gateway to update bearers, comprising:
   a mobility management unit sending to a serving gateway a bearer establishing request message with or without carrying a bearer update indication for indicating the serving gateway whether or not to update the bearer between the serving gateway and a packet data network gateway immediately; and
   after receiving the bearer establishing request message, the serving gateway determining whether or not to update the bearer between the serving gateway and the packet data network gateway immediately according to the bearer establishing request message;
   wherein, if the bearer update indication is an immediate bearer update indication, then the serving gateway is required to update the bearer between the serving gateway and the packet data network gateway immediately; if the bearer update indication is a later bearer update indication or if there is no bearer update indication carried in the bearer request message, then the serving gateway does not need to update the bearer between the serving gateway and the packet data network gateway immediately.

2. The method according to claim 1, wherein the mobility management unit is a mobility management entity, MME, or a serving GPRS support node, SGSN.

3. The method according to claim 1, wherein when the serving gateway changes, the mobility management unit sends the bearer establishing request message to the serving gateway.

4. The method according to claim 1, wherein
   the bearer update indication includes the immediate bear update indication; and
   in an update process of a tracking area or a routing area, the mobility management unit sends to the serving gateway the bearer establishing request message carrying the immediate bearer update indication, and after receiving the immediate bearer update indication, the serving gateway updates the bearer between the serving gateway and the packet data network gateway immediately.

5. The method according to claim 1, wherein
   the bearer update indication includes the later bearer update indication; and
   in the handover process, the mobility management unit sends to the serving gateway the bearer establishing request message carrying the later bearer update indication, and after receiving the later bearer update indication, the serving gateway does not update the bearer between the serving gateway and the packet data network gateway immediately.

6. The method according to claim 5, wherein after receiving the later bearer update indication, the serving gateway updates the bearer between the serving gateway and the packet data network gateway after it acquiring the address of a destination access point of the handover and a tunnel endpoint identifier, TEID.

7. The method according to claim 1, wherein in the handover process, when the mobility management unit sends to the serving gateway the bearer establishing request message without carrying the bearer update indication which indicates the serving gateway not to update the bearer between the serving gateway and the packet data network gateway immediately.

8. The method according to claim 7, wherein when receiving the bearer establishing request message without carrying the bearer update indication, the serving gateway does not update the bearer between the serving gateway and the packet data network gateway immediately.

9. The method according to claim 7, wherein when receiving the bearer establishing request message without carrying the bearer update indication, the serving gateway updates the bearer between the serving gateway and the packet data network gateway after it acquires the address of the destination access point of the handover and the TEID.

10. The method according to claim 6, wherein the destination access point is a Universal Mobile Telecommunication System Radio Access Network, UTRAN, or an evolved base station, eNodeB.

11. The method according to claim 2, wherein the bearer update indication includes an immediate bear update indication; and
in an update process of a tracking area or a routing area, the mobility management unit sends to the serving gateway the bearer establishing request message carrying the immediate bearer update indication, and after receiving the immediate bearer update indication, the serving gateway updates the bearer between the serving gateway and the packet data network gateway immediately.

12. The method according to claim 3, wherein the bearer update indication includes the immediate bear update indication; and
in an update process of a tracking area or a routing area, the mobility management unit sends to the serving gateway the bearer establishing request message carrying the immediate bearer update indication, and after receiving the immediate bearer update indication, the serving gateway updates the bearer between the serving gateway and the packet data network gateway immediately.

13. The method according to claim 2, wherein the bearer update indication includes the later bearer update indication; and
in the handover process, the mobility management unit sends to the serving gateway the bearer establishing request message carrying the later bearer update indication, and after receiving the later bearer update indication, the serving gateway does not update the bearer between the serving gateway and the packet data network gateway immediately.

14. The method according to claim 13, wherein after receiving the later bearer update indication, the serving gateway updates the bearer between the serving gateway and the packet data network gateway after it acquires the address of a destination access point of the handover and a tunnel endpoint identifier, TEID.

15. The method according to claim 3, wherein the bearer update indication includes the later bearer update indication; and
in the handover process, the mobility management unit sends to the serving gateway the bearer establishing request message carrying the later bearer update indication, and after receiving the later bearer update indication, the serving gateway does not update the bearer between the serving gateway and the packet data network gateway immediately.

16. The method according to claim 15, wherein after receiving the later bearer update indication, the serving gateway updates the bearer between the serving gateway and the packet data network gateway after it acquires the address of a destination access point of the handover and a tunnel endpoint identifier, TEID.

17. The method according to claim 2, wherein in the handover process, when the mobility management unit sends to the serving gateway the bearer establishing request message without carrying the bearer update indication which indicates the serving gateway not to update the bearer between the serving gateway and the packet data network gateway immediately.

18. The method according to claim 3, wherein in the handover process, when the mobility management unit sends to the serving gateway the bearer establishing request message without carrying the bearer update indication which indicates the serving gateway not to update the bearer between the serving gateway and the packet data network gateway immediately.

19. The method according to claim 8, wherein the destination access point is a Universal Mobile Telecommunication System Radio Access Network, UTRAN, or an evolved base station, eNodeB.

20. The method according to claim 9, wherein the destination access point is a Universal Mobile Telecommunication System Radio Access Network, UTRAN, or an evolved base station, eNodeB.

* * * * *